US009023546B2

(12) United States Patent
Yamamoto et al.

(10) Patent No.: US 9,023,546 B2
(45) Date of Patent: May 5, 2015

(54) FUEL CELL

(75) Inventors: Yoshinori Yamamoto, Toyota (JP);
Koichiro Yamashita, Toyota (JP);
Takashi Wano, Ibaraki (JP); Ryoichi Matsushima, Ibaraki (JP)

(73) Assignees: Toyota Jidosha Kabushiki Kaisha, Toyota-Shi (JP); Nitto Denko Corporation, Ibaraki-Shi (JP)

( * ) Notice: Subject to any disclaimer, the term of this patent is extended or adjusted under 35 U.S.C. 154(b) by 619 days.

(21) Appl. No.: 12/738,669

(22) PCT Filed: Oct. 17, 2008

(86) PCT No.: PCT/JP2008/068867
§ 371 (c)(1),
(2), (4) Date: Apr. 19, 2010

(87) PCT Pub. No.: WO2009/051228
PCT Pub. Date: Apr. 23, 2009

(65) Prior Publication Data
US 2010/0273083 A1    Oct. 28, 2010

(30) Foreign Application Priority Data
Oct. 19, 2007    (JP) .................................. 2007-272062

(51) Int. Cl.
*H01M 8/24*    (2006.01)
*H01M 8/02*    (2006.01)
(Continued)

(52) U.S. Cl.
CPC .......... *H01M 8/2475* (2013.01); *H01M 8/0271* (2013.01); *H01M 8/04067* (2013.01); *H01M 8/248* (2013.01); *H01M 2008/1095* (2013.01); *Y02E 60/50* (2013.01)

(58) Field of Classification Search
None
See application file for complete search history.

(56) References Cited

U.S. PATENT DOCUMENTS

2007/0231651 A1*    10/2007    Haufe et al. .................... 429/32
2009/0148746 A1*    6/2009    Kato et al. ...................... 429/34

FOREIGN PATENT DOCUMENTS

DE    11 2004 001 970 T5    10/2006
DE    10 2006 015 247 A1    10/2007
(Continued)

OTHER PUBLICATIONS

Zhang Quanzao, "Analysis on Relational of Coefficient of Heat Passage Pore Space Rate, Water Content of Engineering Insulant," Journal of Henan Mechanic and Electric Engineering College, 2000-2 with it's English Abstract.
(Continued)

*Primary Examiner* — Patrick Ryan
*Assistant Examiner* — Angela Martin
(74) *Attorney, Agent, or Firm* — Kenyon & Kenyon LLP (57) ABSTRACT

There is disclosed a fuel cell in which an insulating material is disposed, whereby the thermal diffusion of the inside and outside of a fuel cell can be suppressed to suppress the deterioration of the performance of the fuel cell due to a temperature drop. Moreover, the physical properties of the insulating material are specified, whereby appropriate insulating properties required in the fuel cell can be obtained, and startup properties are improved. A fuel cell has a cell stack in which a plurality of unit cells are stacked, and terminal plates disposed on both sides of the cell stack in a cell stack direction thereof. The fuel cell comprises an insulating portion having an insulating material and holding plates which hold the insulating material from both the sides of the insulating material in the cell stack direction, the insulating material is held between the holding plates, and the insulating material has a thermal conductivity of 0.1 W/mK or less and a porosity of 70% or more.

9 Claims, 7 Drawing Sheets (51) Int. Cl.
*H01M 8/04* (2006.01)
*H01M 8/10* (2006.01)

(56) References Cited

FOREIGN PATENT DOCUMENTS

| JP | 2002-141077 A | | 5/2002 | | |
|---|---|---|---|---|---|
| JP | 2006-147502 A | | 6/2006 | | |
| JP | 2006-164902 A | | 6/2006 | | |
| JP | 2006-332006 A | | 12/2006 | | |
| JP | 2007-250338 | * | 9/2007 | ............. | H01M 8/02 |
| JP | 2007-250338 A | | 9/2007 | | |
| WO | 2007/058054 A1 | | 5/2007 | | |
| WO | WO 2007/058054 | * | 5/2007 | ............. | H01M 8/06 |

OTHER PUBLICATIONS

Chinese Office Action dated Jan. 17, 2013 for CN 2008-80112181.X and partial English translation thereof.

* cited by examiner

FUEL CELL

This is a 371 national phase application of PCT/JP2008/068867 filed 17 Oct. 2008, which claims priority to Japanese Patent Application No. 2007-272062 filed 19 Oct. 2007, the contents of which are incorporated herein by reference.

TECHNICAL FIELD

The present invention relates to a fuel cell having a cell stack in which a plurality of unit cells are stacked.

BACKGROUND ART

Heretofore, each unit cell of a usual fuel cell has had a structure in which separators are provided on both sides of a membrane electrode assembly (hereinafter referred to simply as the "MEA") having an electrolyte membrane, an anode electrode disposed on one surface of the electrolyte membrane and a cathode electrode disposed on the other surface thereof. Moreover, in the fuel cell, a plurality of unit cells are stacked to obtain a cell stack, and at both ends of the cell stack in a cell stack direction, current collection plates (terminal plates), insulators, pressure plates, end plates and the like are disposed.

Such a fuel cell has a fact that the temperature of the unit cells (hereinafter referred to as "the end cells") disposed at the ends of the cell stack is lower than that of the other unit cells of the cell stack. This is because the end cells are influenced by heat release from the terminal plates, the insulators, the pressure plates, the end plates and the like, and the temperature of a refrigerant of an end refrigerant passage drops. In particular, it is known that in the end cell disposed at the end of the cell stack on a total minus side thereof, the temperature of an anode side becomes lower than that of a cathode side. This temperature drop might cause the deterioration of the performance of the fuel cell.

In recent years, another fuel cell has been introduced in which an insulating layer (an insulating dummy cell) is disposed on an outer side from a terminal plate of a cell stack in a cell stack direction thereof to suppress heat release from an end cell and to increase a current collection efficiency (see, e.g., Patent Document 1).

Moreover, there has been introduced still another fuel cell comprising a dummy cell disposed corresponding to a power generation cell in at least one end of a cell stack in a cell stack direction thereof, and in at least the dummy cell or between the dummy cells, an insulating space portion is formed, whereby the dummy cell itself functions as an insulating layer (see, e.g., Patent Document 2).

[Patent Document 1] Japanese Patent Application Laid-Open No. 2006-332006
[Patent Document 2] Japanese Patent Application Laid-Open No. 2006-147502

DISCLOSURE OF THE INVENTION

Problems to be Solved by the Invention

However, in the fuel cell comprising the cell stack provided with the insulating layer (the insulating dummy cell) as described in Patent Document 1, the physical properties (e.g., a thermal conductivity, etc.) of an insulating material constituting the insulating layer have not been investigated. Moreover, in the fuel cell stack described in Patent Document 2, the end of the cell stack is constituted of the dummy cell comprising the insulating space portion (an air chamber), but an insulating material other than air is not described, and also in this conventional technology, the physical properties (e.g., the thermal conductivity, etc.) of the insulating material have not been investigated. Therefore, it is difficult to select the insulating material having optimum physical properties for imparting insulating properties required in the fuel cell.

The present invention has been developed in view of such situations, and an object thereof is to provide a fuel cell in which an insulating portion provided with an insulating material is disposed, whereby the thermal diffusion of the inside and outside of the fuel cell can be suppressed to correct the non-uniformity of a temperature distribution in a cell plane and to suppress the deterioration of the performance of the fuel cell due to a temperature drop. Moreover, the physical properties of the insulating material are specified, whereby appropriate insulating properties required in the fuel cell can be obtained, and startup properties are improved.

Means for Solving the Problem

To achieve this object, there is provided a fuel cell having a cell stack in which a plurality of unit cells are stacked, and terminal plates disposed on both sides of the cell stack in a cell stack direction thereof, the fuel cell comprising: an insulating portion having an insulating material and holding plates which hold the insulating material from both the sides of the insulating material in the cell stack direction, the insulating material being held between the holding plates, wherein the insulating material has a thermal conductivity of 0.1 W/mK or less and a porosity of 70% or more.

The fuel cell having this constitution comprises the insulating portion in which both the sides of the insulating material in the cell stack direction are held by the holding plates, whereby the thermal diffusion of the inside and outside of the fuel cell can be suppressed to correct the non-uniformity of the temperature distribution in the cell plane and to suppress the deterioration of the performance of the fuel cell due to the temperature drop. Furthermore, since the insulating material has physical properties such as the thermal conductivity of 0.1 W/mK or less and the porosity of 70% or more, the appropriate insulating properties required in the fuel cell can be obtained, and the startup properties of the fuel cell can be improved.

If the thermal conductivity of the insulating material exceeds 0.1 W/mK, it is difficult to obtain the appropriate insulating properties required in the fuel cell. Moreover, if the porosity of the insulating material is less than 70%, fluctuation easily occurs in the thermal conductivity.

As one configuration of the fuel cell according to the present invention, the fuel cell has power generation cells which contribute to power generation and non-power generation cells which do not contribute to the power generation, and may comprise a constitution in which the insulating portion is disposed in the non-power generation cells. In this constitution, the non-power generation cells may be disposed on the inner sides of the terminal plates in the cell stack direction. Furthermore, in this constitution, among the unit cells constituting the cell stack, end cells disposed at both ends of the cell stack in the cell stack direction, respectively, may be the non-power generation cells.

Here, in the fuel cell, as to the power generation cells positioned near the ends of the cell stack in the cell stack direction, the temperature drop easily occurs by heat release from terminal electrodes (the terminal plates) for taking out a power, end plates provided to hold the stacked power generation cells and the like. Moreover, in the power generation cells in which the temperature drop has occurred, dew condensation by the condensation of vapor easily occurs, whereby the deterioration of a power generation performance might be incurred. In the present invention, the end cells are used as the non-power generation cells, and are hence provided with the insulating portions, whereby in addition to the above advantages, the thermal diffusion can efficiently be decreased to further suppress the temperature drop.

Moreover, as one configuration of the fuel cell according to the present invention, each of the non-power generation cells may be an insulating cell held between the power generation cells. In this constitution, among the unit cells constituting the cell stack, the end cells disposed at both the ends of the cell stack in the cell stack direction, respectively, may be constituted of the non-power generation cells.

Furthermore, as one configuration of the fuel cell according to the present invention, the cell stack may comprise a constitution where between the end cells constituted of the non-power generation cells and disposed at both the ends of the cell stack in the cell stack direction, there are disposed a power generation cell stack in which the plurality of power generation cells are stacked, the insulating cell disposed at the end of the power generation cell stack on a total minus side and the power generation cell disposed on the side of the insulating cell opposite to the power generation cell stack. In such a constitution, in addition to the above advantages, it is possible to further efficiently suppress the thermal diffusion from the end of the fuel cell on the total minus side where an anode side temperature easily becomes lower than a cathode side temperature, whereby the deterioration of the power generation performance can be suppressed.

In addition, as one configuration of the fuel cell according to the present invention, the fuel cell may comprise a constitution in which the non-power generation cells are disposed on the outer sides of the terminal plates in the cell stack direction. Moreover, in this constitution, the non-power generation cells may further be disposed on the inner sides of the terminal plates in the cell stack direction.

The insulating material preferably has an electric resistance. This electric resistance is preferably 400 mΩ or less in a case where a load is 0.2 MPa.

Effect of the Invention

The fuel cell according to the present invention comprises the insulating portion in which the insulating material having physical properties such as the thermal conductivity of 0.1 W/mK or less and the porosity of 70% or more is held between the holding plates, whereby the appropriate insulating properties required in the fuel cell can be obtained. Therefore, the thermal diffusion of the inside and outside of the fuel cell can be suppressed, the non-uniformity of the temperature distribution in the cell plane can be corrected, and the startup properties can be improved. In consequence, the fuel cell having a high reliability and a high performance can be provided.

DESCRIPTION OF REFERENCE NUMERALS

1 . . . fuel cell, 10 . . . cell stack, 11 . . . power generation cell stack, 12 . . . power generation cell, 13A, 13B . . . end cell (non-power generation cell), 14A, 14B . . . terminal plate, 20 . . . insulating cell (non-power generation cell), 21 . . . insulating material, 22, 23 . . . holding plate, and 24, 27 . . . insulating portion.

BEST MODE FOR CARRYING OUT THE INVENTION

Next, fuel cells according to preferable embodiments of the present invention will be described with reference to the drawings. It is to be noted that the embodiments described as follows are illustrations for explaining the present invention, and the present invention is not limited only to these embodiments. Therefore, the present invention can be implemented in various configurations without departing from the scope of the present invention.

Figure 1:
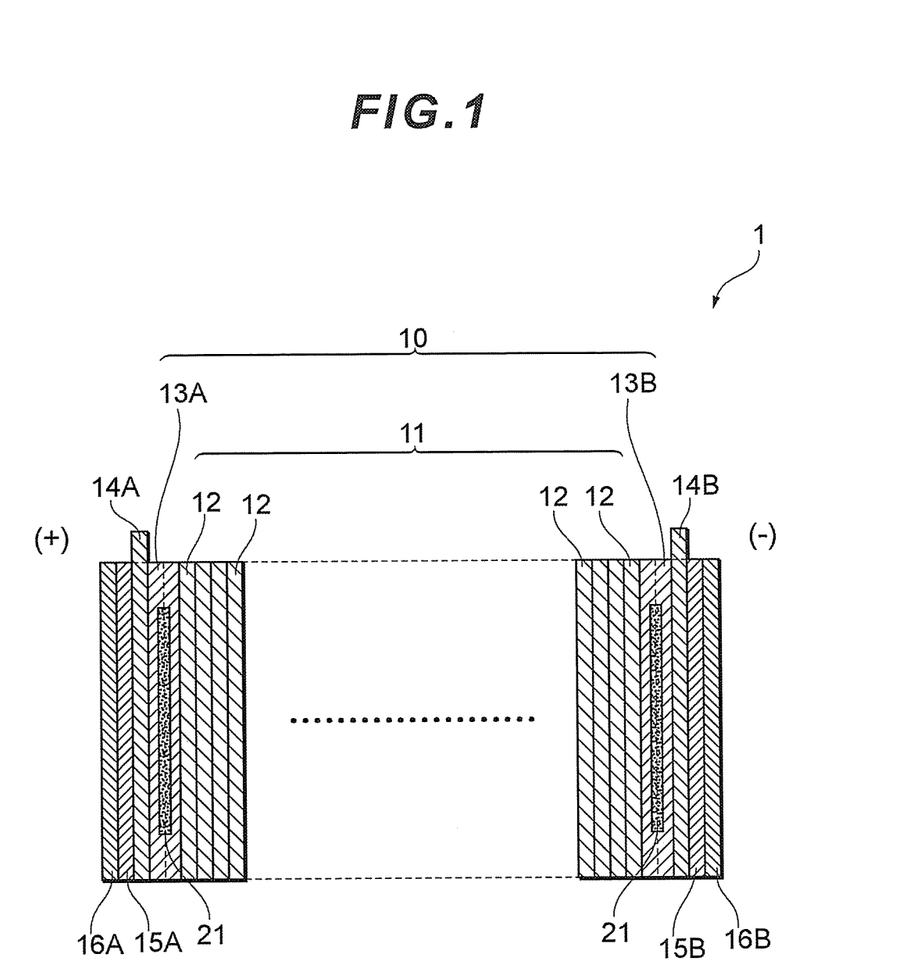
FIG. 1 is a sectional view schematically showing a fuel cell according to an embodiment of the present invention.
Figure 2:
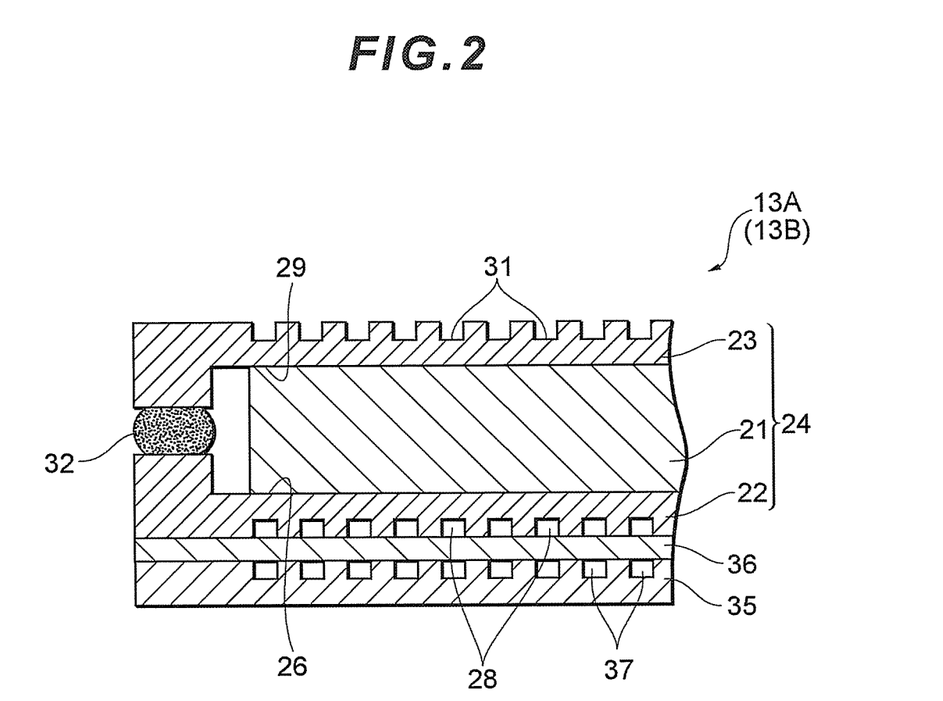
FIG. 2 is a sectional view showing an enlarged part of an end cell disposed in the fuel cell shown in FIG. 1.
Figure 3:
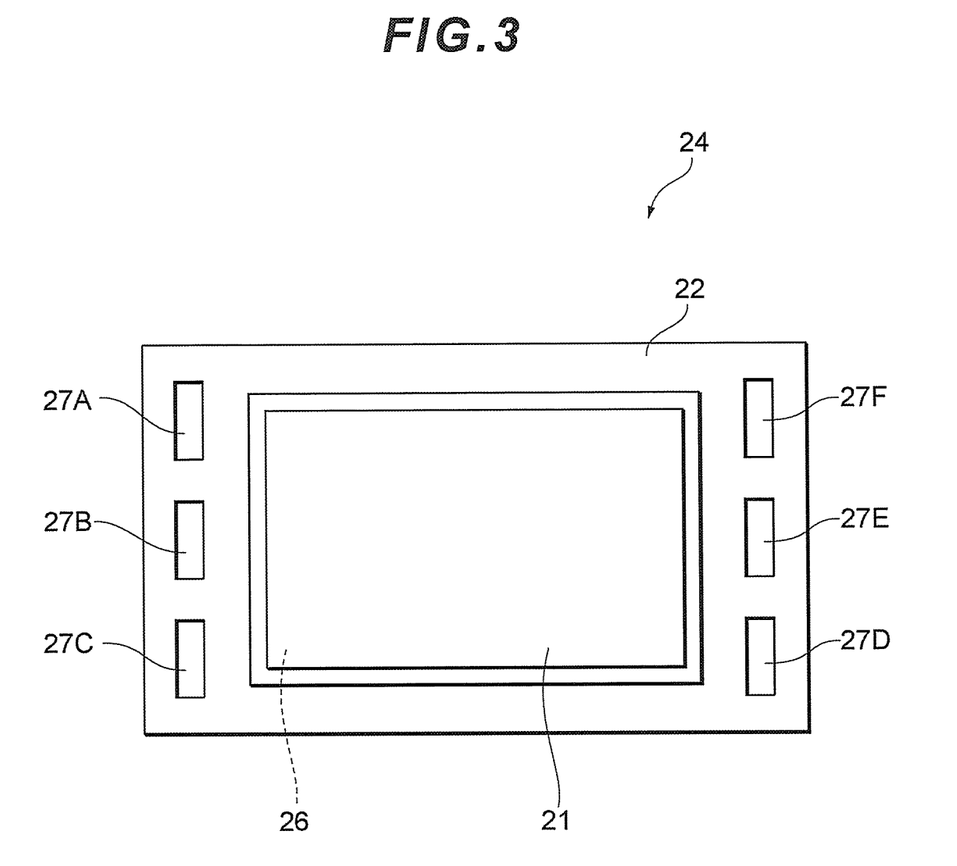
FIG. 3 is a plan view of an insulating portion which is a constituent element of the end cell disposed in the fuel cell shown in FIG. 1.

FIG. 1 is a sectional view schematically showing a fuel cell according to the embodiment of the present invention, FIG. 2 is a sectional view showing an enlarged part of an end cell disposed in the fuel cell shown in FIG. 1, and FIG. 3 is a plan view of an insulating portion which is a constituent element of the end cell disposed in the fuel cell shown in FIG. 1. It is to be noted that in the diagrams, for the easy understanding of the explanation, the thickness, size, enlargement/reduction ratio and the like of each member are not matched with actual values.

As shown in FIGS. 1 through 3, a fuel cell 1 according to the present embodiment comprises a cell stack 10 having a power generation cell stack 11 in which a plurality of power generation cells 12 contributing to the power generation of the fuel cell 1 are stacked and end cells 13A and 13B disposed on both sides of the power generation cell stack 11 in a cell stack direction thereof; terminal plates 14A and 14B disposed on the outer sides of the cell stack 10 in the cell stack direction, respectively; insulators 15A and 15B disposed on the outer sides of the terminal plates 14A and 14B in the cell stack direction, respectively; and end plates 16A and 16B disposed on the outer sides of the insulators 15A and 15B in the cell stack direction, respectively.

Each of the power generation cells 12 is constituted of a membrane electrode assembly including an electrolyte membrane made of an ion exchange membrane and a pair of electrodes which hold both surfaces of this membrane, and a pair of separators which hold this membrane electrode assembly from the outer sides thereof. The separators are conductors made of, for example, a metal as a base material, have gas passages for supplying a cathode gas such as air and an anode gas such as a hydrogen gas to electrodes, and perform a function of shutting off the mixture of different types of fluids to be supplied to the power generation cells 12 disposed adjacent to one another. This constitution can cause an electrochemical reaction in the membrane electrode assembly of the power generation cell 12 to obtain an electromotive force. Moreover, this electrochemical reaction is a heat generating reaction, and hence the separator is provided with a refrigerant passage through which a refrigerant (cooling water or the like) for cooling the fuel cell flows. Moreover, the power generation cell 12 is provided with a through hole (not shown) for forming a manifold. When the plurality of power generation cells 12 are superimposed onto one another to form the power generation cell stack 11, these through holes are superimposed onto one another, whereby manifolds (not shown) for the circulation of the anode gas, the circulation of the cathode gas and the circulation of the refrigerant are formed through the stack in the cell stack direction.

The end cells 13A and 13B are non-power generation cells which do not contribute to the power generation of the fuel cell 1. In particular, as shown in FIG. 2, each end cell has an insulating portion 24 comprising a sheet-like insulating material 21, a holding plate 22 disposed on one surface of the insulating material 21 in the cell stack direction, and a holding plate 23 disposed on the other surface of the insulating material 21 in the cell stack direction, and having a constitution in which the insulating material 21 is held by the holding plates 22 and 23 from both sides of the material in the cell stack direction and in which a resin material 32 is interposed between the ends of the holding plates 22 and 23. The end cell has a constitution in which a separator 35 provided with a cathode gas passage 37 is disposed on the surface of the insulating portion 24 on a holding plate 22 side via a separator 36.

The insulating material 21 has physical properties such as a thermal conductivity of 0.1 W/mK or less, a porosity of 70% or more and an electric resistance of about 250 mΩ under a load of 0.2 MPa. In the present embodiment, as materials constituting the insulating material 21, for example, a conductive material of carbon or the like and a thermoplastic resin as a binder thereof are used. Moreover, in the present embodiment, the thickness of the insulating material 21 (the thickness in the cell stack direction) is set to about 2 mm.

The holding plate 22 is made of a material having a conductivity (stainless steel in the present embodiment), and the center thereof is provided with a concave dug portion 26 (see FIG. 3) in which the insulating material 21 is mounted. Moreover, as shown in FIG. 3, the holding plate 22 is provided with a plurality of through holes 27A to 27F for forming manifolds. The through holes 27A, 27B and 27C are used to form the manifolds for the supply of the cathode gas, the supply of the refrigerant and the supply of the anode gas, respectively, and the through holes 27D, 27E and 27F are used to form the manifolds for the discharge of the cathode gas, the discharge of the refrigerant and the discharge of the anode gas, respectively. In the surface of the holding plate 22 opposite to the surface thereof provided with the dug portion 26, an anode gas passage 28 is formed.

The holding plate 23 is made of a material having a conductivity (stainless steel in the present embodiment), and the center thereof is provided with a concave dug portion 29 (see FIG. 2) in which the insulating material 21 is mounted. Moreover, in the same manner as in the holding plate 22, the holding plate 23 is provided with a plurality of through holes (not shown) for forming manifolds. In the surface of the holding plate 23 opposite to the surface thereof provided with the dug portion 29, a cooling water passage 31 is formed.

It is to be noted that the separators 35 and 36 are also provided with a plurality of through holes (not shown) for forming manifolds in the same manner as in the holding plates 22 and 23.

The terminal plates 14A and 14B are terminal electrodes for taking out a power, and are formed into a plate-like shape by use of a metal such as iron, stainless steel, copper or aluminum. The terminal plates 14A and 14B in the present embodiment are disposed so as to directly come in contact with the end cells 13A and 13B. The surfaces of the terminal plates 14A and 14B which come in contact with the end cells 13A and 13B are subjected to a surface treatment such as a plating treatment by use of gold, silver, aluminum, nickel, zinc or tin, and this surface treatment acquires a contact resistance between the terminal plate 14A and the end cell 13A and a contact resistance between the terminal plate 14B and the end cell 13B. Moreover, both or one of the terminal plates 14A and 14B is provided with holes for forming manifolds in the same manner as in the power generation cells 12, the holding plates 22 and 23 and the like.

It is to be noted that a tension plate (not shown) is bridged between the end plates 16A and 16B, and the tension plate is bolted to the end plates 16A and 16B, whereby a predetermined compressive force (a fastening load) is added to the fuel cell 1 in the cell stack direction thereof.

In the fuel cell 1 comprising this constitution, both ends of the cell stack 10 in the cell stack direction thereof are provided with the end cells 13A and 13B, and the end cells 13A and 13B are provided with the insulating portions 24, whereby a temperature drop due to heat release from the terminal plates 14A and 14B, the end plates 16A and 16B or the like can be suppressed, and the thermal diffusion between the inside and outside of the fuel cell 1 can efficiently be suppressed. Therefore, the startup properties of the fuel cell 1 can be improved in not only ordinary temperature environment but also low temperature environment.

Figure 4:
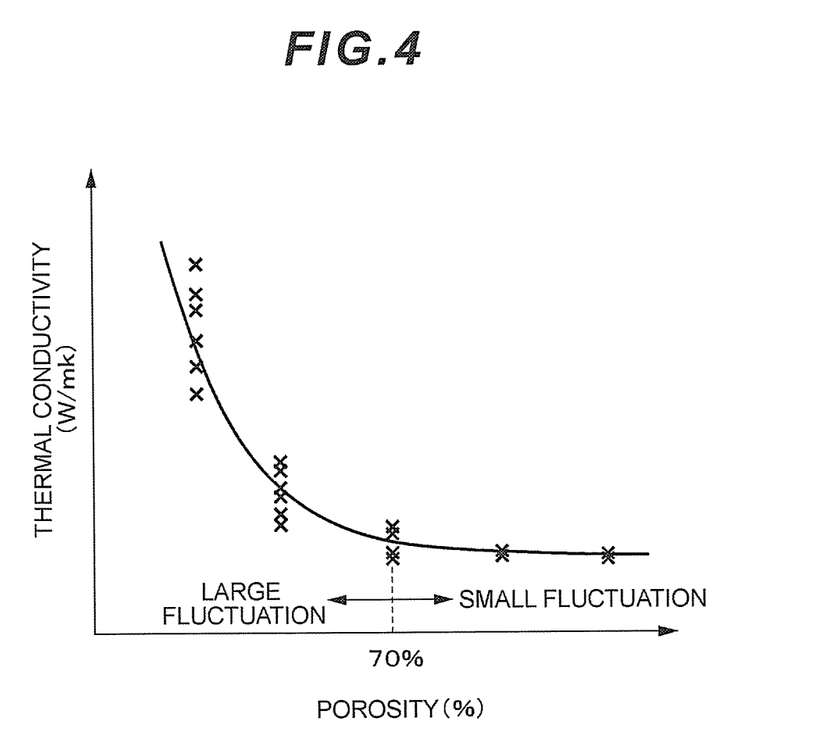
FIG. 4 is a diagram showing a relation between a thermal conductivity (W/mK) and a porosity (%) of an insulating material.

Next, a relation between the thermal conductivity (W/mK) and the porosity (%) of the insulating material 21 was checked, and this result was plotted with x in a graph shown in FIG. 4. It is seen from FIG. 4 that as the porosity (o) of the insulating material 21 is low, fluctuation occurs in the thermal conductivity (W/mK). Specifically, it is seen that if the porosity (%) of the insulating material 21 is less than 70%, the fluctuation easily occurs in the thermal conductivity (W/mK) and that if the porosity (%) of the insulating material 21 is 70% or more, the fluctuation of the thermal conductivity (W/mK) decreases.

Figure 5:
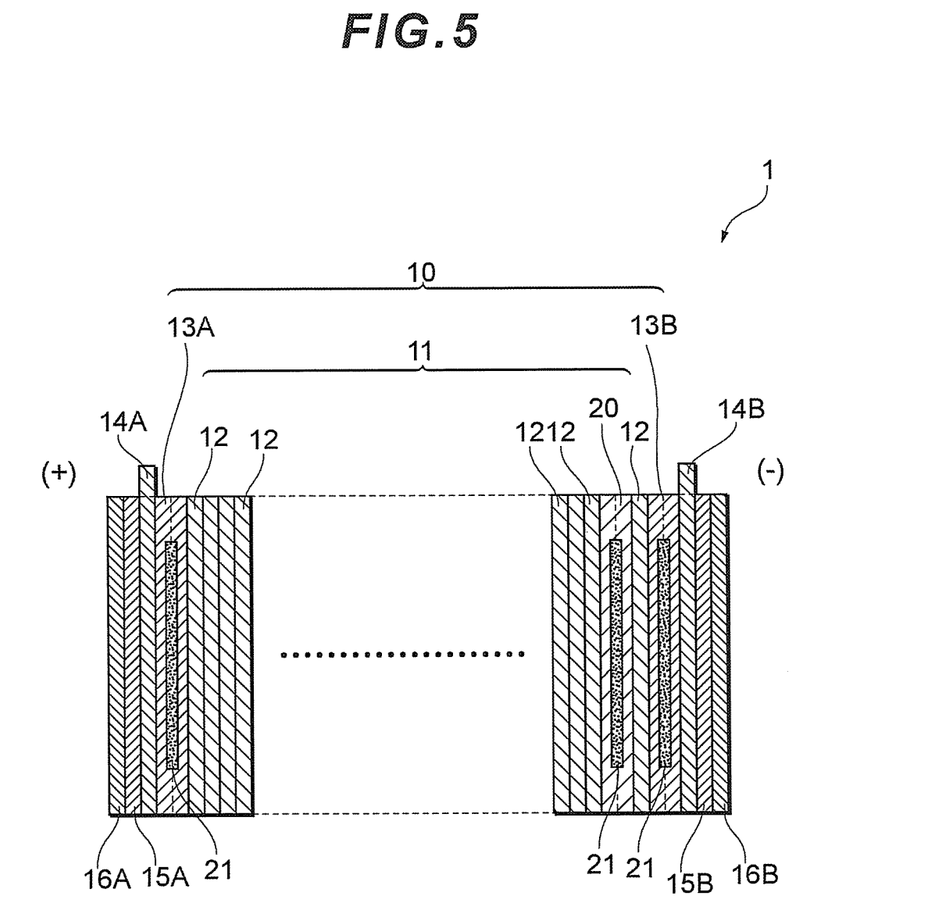
FIG. 5 is a sectional view schematically showing a fuel cell according to another embodiment of the present invention.
Figure 6:
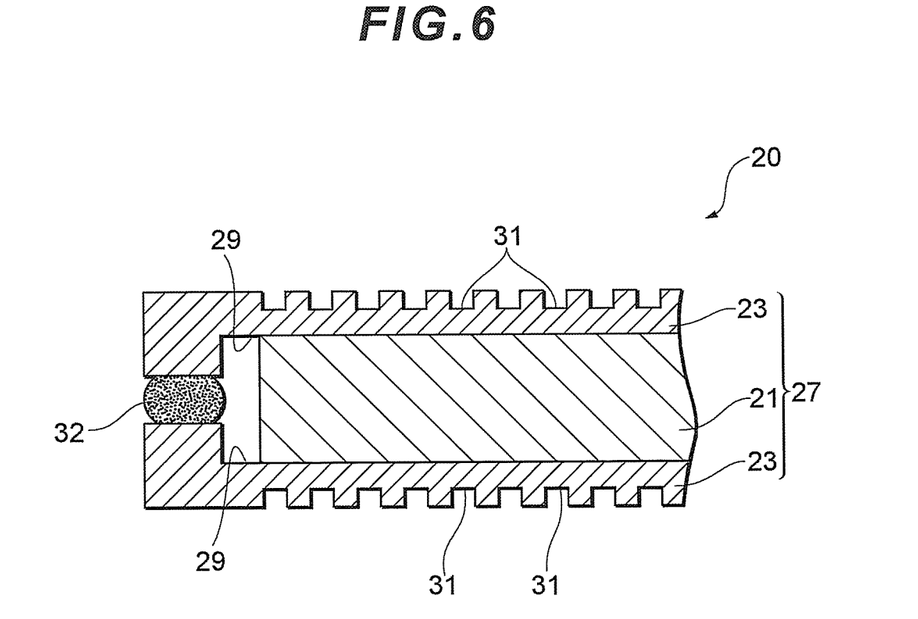
FIG. 6 is a sectional view showing an enlarged part of an insulating cell disposed in the fuel cell shown in FIG. 5.

It is to be noted that it has been described in the present embodiment that the end cells 13A and 13B which are the non-power generation cells are disposed on both the sides of the power generation cell stack 11 in the cell stack direction, respectively, and that the terminal plates 14A and 14B are disposed on the outer sides of the end cells lap, and 13B in the cell stack direction, respectively, but the present invention is not limited to this embodiment. As shown in, for example, FIG. 5, an insulating cell 20 which is a non-power generation cell may be disposed on the total minus side of a power generation cell stack 11, a power generation cell 12 may be disposed on the side of the insulating cell 20 opposite to the power generation cell stack 11, an end cell 13B may be disposed on the total minus side of the power generation cell 12, and an end cell 13A may be disposed on a total plus side of the power generation cell stack 11. As shown in FIG. 6, the insulating cell 20 has an insulating portion 27 comprising an insulating material 21 and holding plates 23 disposed on both surfaces of the insulating material 21 in the cell stack direction, and having a constitution in which the insulating material 21 is held by the holding plates 23 from both sides of the material in the cell stack direction and in which a resin material 32 is interposed between the ends of the holding plates 23. In this constitution, since the insulating cell 20 and the end cell 13B are positioned on the total minus side of the cell stack 10, the thermal diffusion between the inside and outside of the fuel cell 1 can further efficiently be suppressed.

Figure 7:
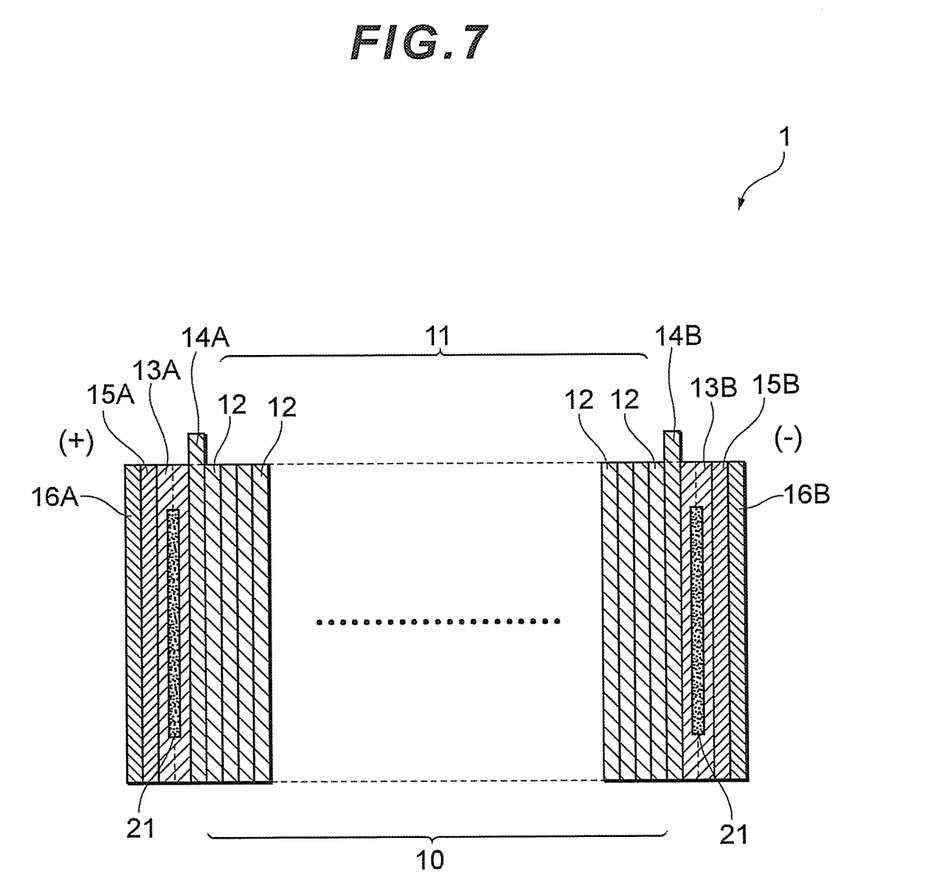
FIG. 7 is a sectional view schematically showing a fuel cell according to still another embodiment of the present invention.

Moreover, in the fuel cell 1 according to the present invention, as shown in FIG. 7, end cells 13A and 13B may be disposed on the outer sides of terminal plates 14A and 14B in a cell stack direction, respectively. Also in this case, a temperature drop due to heat release from the terminal plates 14A and 14B, end plates 16A and 16B or the like can be suppressed and the thermal diffusion between the inside and outside of the fuel cell 1 can efficiently be suppressed in the same manner as in the above embodiment. Therefore, the startup properties of the fuel cell 1 can be improved in not only ordinary temperature environment but also low temperature environment. It is to be noted that in this constitution, insulating cells 20 may be disposed on the inner sides of the terminal plates 14A and 14B in the cell stack direction.

Furthermore, in the fuel cell 1 according to the present invention, a usual end cell which is not provided with the insulating material 21 may be used and the only insulating cell 20 may be disposed as desired.

Moreover, needless to say, the present invention is also applicable to the fuel cell 1 having a constitution in which a plurality of cell stacks are electrically connected to one another via connection plates.

Furthermore, it has been described in the present embodiment that the holding plates 22 and 23 are made of stainless steel, but the present invention is not limited to this embodiment, and the holding plates 22 and 23 may be made of another material such as a resin as long as the material has a conductivity and does not disturb the function of the fuel cell 1. In particular, when a conductive resin is used as the material of the holding plates 22 and 23, the holding plates 22 and 23 can easily be formed by, for example, injection or the like, and hence processability can be improved.

Moreover, the conductive resin is excellent in insulating properties as compared with stainless steel, and hence can improve the insulating properties as compared with the holding plates 22 and 23 made of stainless steel. Therefore, when the holding plates 22 and 23 made of stainless steel are used, the resin material 32 interposed between the holding plates 22 and 23 for a purpose of imparting the insulating properties in a direction substantially vertical to the cell stack direction is not required, and the number of components can be decreased. Moreover, an assembling process can be simplified. Furthermore, since the holding plates 22 and 23 are made of the conductive resin, the increase of the heat capacity of the holding plates 22 and 23 can be suppressed, and power generation efficiency during low temperature start can be improved. In addition, the own weights of the holding plates 22 and 23 can be decreased.

Furthermore, it has been described in the present embodiment that as the materials constituting the insulating material 21, for example, the conductive material of carbon or the like and the thermoplastic resin as the binder thereof are used, but the present invention is not limited to this embodiment. As long as the insulating material 21 has the thermal conductivity of 0.1 W/mK or less and the porosity of 70% or more and does not disturb the performance of the fuel cell 1, there may be used another material, for example, a foam nickel material, a porous material subjected to a surface treatment for acquiring an electric resistance, a sheet prepared by mixing a conductive material such as carbon (conductive carbon black) and fluorocarbon resin, graphite, a carbon nano-tube, chemically modified carbon black, a sheet prepared by mixing metal powder (e.g., gold, silver, platinum or the like) with a single material of PTFE, ETFE, PVdF, PFA or the like or a plurality of types of fluorocarbon resins or the like.

Moreover, in the present embodiment, the insulating material 21 having physical properties such as an electric resistance of about 250 mΩ under a load of 0.2 MPa is used, but the present invention is not limited to this embodiment, and the electric resistance of the insulating material 21 may be selected as desired, but is preferably, for example, about 400 mΩ or less under the load of 0.2 MPa. Furthermore, it has been described in the present embodiment that the thickness of the insulating material 21 is set to about 2 mm, but the present invention is not limited to this embodiment, and the thickness of the insulating material 21 may arbitrarily be set to such a thickness as to acquire desired insulating properties in accordance with the thermal conductivity and porosity of the insulating material 21, the build of the fuel cell stack, the other use conditions and the like.

The invention claimed is:

1. A fuel cell having a cell stack in which a plurality of unit cells are stacked, and terminal plates disposed on both sides of the cell stack in a cell stack direction thereof,
    the fuel cell comprising:
    insulating portions each having an insulating material and holding plates which hold the insulating material from both sides of the insulating material in the cell stack direction, the insulating material being held between the holding plates,
    wherein the insulating portions are disposed at both ends of the cell stack in the cell stack direction,
    the insulating material has a thermal conductivity of 0.1 W/mK or less and a porosity of 70% or more, in order to prevent thermal conductivity fluctuations at values of porosity of the insulating material lower than 70%,
    each of the holding plates has a concave dug portion in which the insulating material is to be mounted, and the insulating material is disposed in the dug portion.

2. The fuel cell according to claim 1, further comprising:
    power generation cells which contribute to power generation; and
    non-power generation cells which do not contribute to the power generation,
    wherein the insulating portion is disposed in the non-power generation cells.

3. The fuel cell according to claim 2, wherein the non-power generation cells are disposed on the inner sides of the terminal plates in the cell stack direction.

4. The fuel cell according to claim 3, wherein the non-power generation cells are end cells disposed at both ends of the cell stack in the cell stack direction, respectively.

5. The fuel cell according to claim 2, wherein each of the non-power generation cells is an insulating cell held between the power generation cells.

6. The fuel cell according to claim 5, wherein the cell stack comprises a constitution where between the end cells constituted of the non-power generation cells and disposed at both ends of the cell stack in the cell stack direction, there are disposed a power generation cell stack in which the plurality of power generation cells are stacked, the insulating cell disposed at one end of the cell stack on a side corresponding to a negative pole side and the power generation cell disposed on the side of the insulating cell opposite to the power generation cell stack.

7. The fuel cell according to claim 2, wherein the non-power generation cells are disposed on the outer sides of the terminal plates in the cell stack direction.

8. The fuel cell according to claim 1, wherein the insulating material has an electric resistance.

9. The fuel cell according to claim 8, wherein the electric resistance is 400 m$\Omega$ or less in a case where a load is 0.2 MPa.

* * * * *